April 27, 1965 G. G. MYERS 3,181,032

CIRCUIT OVERLOAD RESPONSIVE SHUTOFF SYSTEM WITH RELAY DRIVING ENERGY STORAGE

Filed March 12, 1962

INVENTOR.
GRANT G. MYERS

BY

Woody and Kintzinger

ATTORNEYS

United States Patent Office 3,181,032
Patented Apr. 27, 1965

3,181,032

CIRCUIT OVERLOAD RESPONSIVE SHUTOFF SYSTEM WITH RELAY DRIVING ENERGY STORAGE

Grant G. Myers, Cedar Rapids, Iowa, assignor to Collins Radio Company, Cedar Rapids, Iowa, a corporation of Iowa Filed Mar. 12, 1962, Ser. No. 179,018
18 Claims. (Cl. 317—33)

Figures 1, 2, 3:
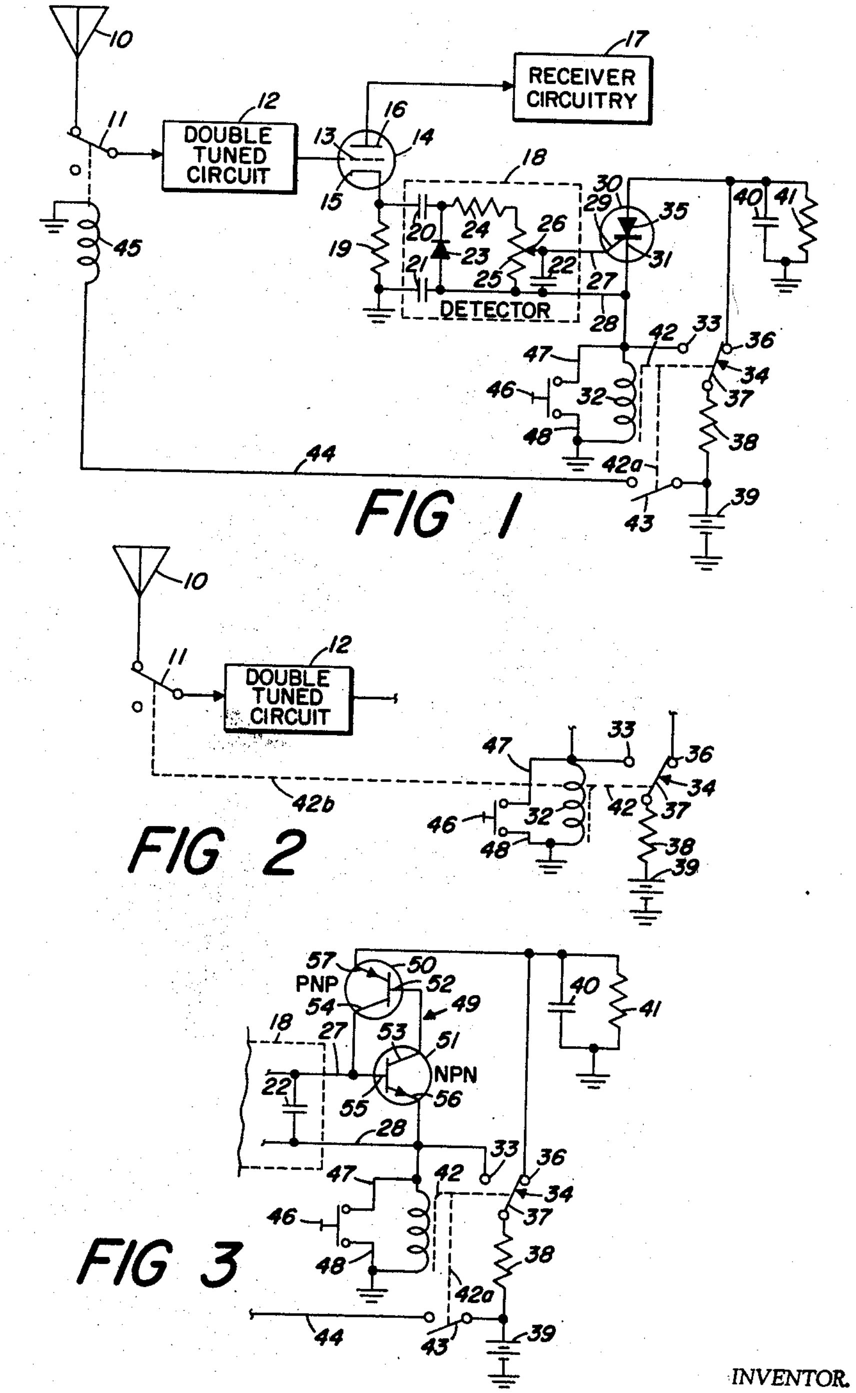

This invention relates in general to circuit overload protective systems, and in particular to a circuit shutoff relay system including a solid state switch, a direct current supply, and a capacitor in combination for automatic actuation of a circuit shutoff relay.

There are overload protective devices and systems for circuit shutoff that do the job quite satisfactorily in many circuits. However, difficulties may be encountered where it is important to hold any power drain from the circuit signal path to a minimum. This is particularly the case where it is necesary that signal distortion be minimized, and where overload is detected from a relatively low signal power level circuit.

It is, therefore, a principal object of this invention to provide circuit overload shutoff requiring extremely low power drain from the circuit signal path.

A further object is to provide automatically activated protective means for R.F. circuitry for preventing overload damage such as could be caused by excessive power input from an antenna encountered when an adjacent transmitter is tuned accidentally through the R.F. receiver frequency.

A feature of this invention useful in accomplishing the above objects is the use of a solid state switch requiring very low current flow to fire (open), for controlling relay switch means and providing circuit overload protection. A circuit power load sensing device provides a low level current output varying directly with power loading of the circuit. The current output of the power load sensing device fires the solid state switch when it rises to a very low level maximum.

A relay, connected to the cathode of the solid state switch, is equipped with a nonshorting two-pole switch to which a direct current supply and a resistor in series are connected. When the relay is de-activated the circuit current supply is connected through the relay switch to the anode of the solid state switch, and when the relay is thrown, the D.C. supply is connected through the relay switch directly to the junction of the relay coil and the cathode of the solid state switch. A solid state switch is used that has substantially zero anode to cathode current in the unfired state. This prevents undesired current flow through the relay coil that could give rise to relay switch bounce and sticking under vibration conditions.

A capacitor and resistor in parallel are connected between the switch anode and ground and when the relay is de-activated the capacitor is charged by the D.C. supply. This capacitor charge is useful in two ways. First, it supplies sufficient power to complete throwing of the relay and, second, with the D.C. supply connected to the junction of the switch cathode and the relay coil, run-off of capacitor charge through the parallel resistor and ground insures reversal of switch anode to cathode potential for switch shutoff. The relay is self-holding when the D.C. supply is connected to the relay coil directly through the relay switch.

A manual reset switch is also featured for shorting across the relay coil in order that the relay may be reset from the self-holding state. When the reset switch is depressed current flow through the D.C. supply and the solid state switch is limited by a resistor. This protects the solid state switch should a current flow signal level to fire be received while the relay coil is still shorted out by the reset switch.

Specific embodiments representing what are presently regarded as the best modes of carrying out the invention are illustrated in the accompanying drawing.

In the drawing:

FIGURE 1 represents a low power activated circuit shutoff relay system utilizing a PNPN solid state switch for the circuit overload protective switch in the antenna to receiver radio frequency input circuit signal path;

FIGURE 2, another embodiment of a similar circuit overload protective system; and FIGURE 3, an embodiment similar to FIGURE 1 utilizing a two-transistor solid state switch in place of the PNPN solid state switch used in the embodiments of FIGURES 1 and 2.

Referring to the drawing:

The embodiments shown are each illustrated as a circuit overload protective device for a radio frequency receiver. In each, the overload protective device is arranged to disconnect the receiver from the antenna when the R.F. power, received and passed by a double tuned filter circuit, is at an excessive power level for the receiver. This is a condition which may arise, for example, when the signal of a transmitter located relatively close to the receiving antenna results in excessive power input to the receiver circuit at the received frequency. Such a condition will probably be encountered when an adjacent transmitter is tuned accidentally through the R.F. receiver frequency. In each embodiment the R.F. signal received by the antenna and passed by a filter circuit is rectified by a detecting device. This provides a D.C. switch triggering signal which varies directly with the power level in the R.F. signal input to the receiver.

Referring particularly to FIGURE 1, R.F. receiving antenna 10 is connected for feeding an R.F. signal input through normally closed relay control switch 11 to a double tuned filter circuit 12. The R.F. signal output of the double tuned circuit is applied to the control grid 13 of multielement amplifier 14 (shown as a triode tube including a cathode 15 and a plate 16). The plate output of the amplifier 14 is applied as an input to the following R.F. and I.F. stages in receiver circuitry 17.

A standard detector 18 is connected across a resistor 19, connecting cathode 15 to ground, for receiving a cathode follower type signal as an input. The detector 18, including capacitors 20, 21 and 22, diode 23, resistor 24, and resistor 25, with an adjustable tap 26, has two output leads 27 and 28. The output lead 27 connects the adjustable tap 26 of detector 18 to the gate electrode 29 of a solid state PNPN type switch 30. The other output lead 28 of detector 18 is connected to the junction of the cathode 31 of the solid state switch 30 and relay 32.

Relay 32 is connected between the cathode 31 of solid state switch 30 and ground. The normally open contact 33 of a relay 32 driven two-pole nonshorting switch 34 is connected to the junction of the cathode 31 and relay 32. The anode 35 of solid state switch 30 is connected to the normally closed contact 36 of the switch 34. The movable contact arm 37 of switch 34 is connected serially through resistor 38 and direct current supply 39 to ground. The anode 35 of the solid state switch 30 and relay switch contact 36, are both connected to ground through the capacitor 40 and resistor 41 in parallel. Mechanical drive 42 of relay 32 is connected to the movable contact arm 37 of switch 34 and is provided with an extension *42a* for controlling a normally open single-pole relay switch 43. This is positioned in line 44, connecting the junction of resistor 38 and the D.C. supply 39 (shown as a battery) through the coil of relay 45 to ground, to provide for opening relay switch 11 when the relay switch 43 is closed.

A manual reset switch 46, of the biased-to-open type, is arranged, along with lines 47 and 48, for providing a short circuit path across the coil of relay 32 in order that the relay will be reset when switch 46 is manually depressed. While the reset switch 46 is shorting out the coil of relay 32, resistor 38 protects the solid state switch 30 in the event the switch 30 should receive a signal to fire while the coil of the relay is still shorted out.

In operation, solid state switch 30 is fired for positive anode 35 to relatively negative cathode 31 current flow when the gate 29 to cathode 31 current flow input from detector 18 has risen to relatively a very low current level, low in the microamp range. The anode 35 to cathode 31 current flow also passes through and activates relay 32. Since the power output requirements of detector 18 are very low, not exceeding approximately 10 microwatts, for firing solid state switch 30, the power input requirements to detector 18 are correspondingly low. Hence, the circuit overload shutoff trigger switch system imposes extremely low power drain on the circuit signal path and thereby minimizes any signal distortion when the signal circuit is not cut off by overload.

Capacitor 40, which becomes charged by battery 39, supplies the power required for maintaining sufficient current flow through switch 30 (when fired) and the coil of relay 32 to complete throwing of the movable contact arm 37 from normally closed contact 36 to normally open contact 33. Thereafter current flow from the D.C. battery source 39 flowing through the coil of relay 32 maintains the relay in a self-holding state. This continues until the circuit overload protective device is reset by depression of manual reset switch 46 which short-circuits the coil of relay 32. Such de-activation of relay 32 returns relay switch 34 to the de-activated state. Activation of relay 32 acts through mechanical drive extension 42*a* to close switch 43 and connect the coil of relay 45 directly to D.C. supply 39. This activates the relay 45 and opens normally closed switch 11 to break and provide overload shutoff for the antenna 10 to receiver 17 R.F. signal input circuit.

Switch 11 is indicated to be a normally closed switch and switch 43 a normally open switch. However, they could be reversed with switch 11 a normally open switch and switch 43 a normally closed switch and with relay 45 in a normally activated state. This arrangement has been used in some equipments in order to break the antenna 10 to R.F. receiver 17 circuit when the equipment power is off.

Whenever relay 32 throws the movable contact arm 37 to normally open contact 33 the junction of switch cathode 31 and the coil of relay 32 is directly connected through switch 34 and resistor 38 to the D.C. source 39. Immediately after movable contact arm 37 has broken away from contact 36, capacitor 40, in addition to supplying continued relay activating power, begins to discharge through resistor 41 and ground. This insures reversal of potential between the anode and cathode of solid state switch 30 and insures positive cutoff of the switch 30 during each cycle of operation.

Components used with a circuit overload shutoff system installed in a Collins Radio Company, 635R–1 Band-Pass Filter for radio frequency receivers include the following:

| | |
|---|---|
| Resistor 19 | 390 ohms. |
| Capacitor 20 | 0.02 μf. |
| Capacitor 21 | 0.02 μf. |
| Capacitor 22 | 0.1 μf. |
| Diode 23 | 1N457. |
| Resistor 24 | 3.9K ohms. |
| 3.9K ohms. | |
| Resistor 25 | 50K ohms. |
| Solid state switch 30 | 3A61S of Solid State Products Inc. |
| Resistor 38 | 160 ohms. |
| D.C. supply 39 | 28 volt source. |
| Capacitor 40 | 10 μf. at 50 volts. |
| Resistor 41 | 18K ohms. |

It should be noted that resistor 38 is relatively small in relation to resistor 41 and that, therefore, capacitor 40 is capable of being charged according to the formula $$\frac{R41 \times E39}{R38 + R41}$$

almost up to the voltage of D.C. supply 39. The solid state switch 30 is a silicon diffused junction PNPN controlled switch chosen for a maximum gate 29 to cathode 31 current required to fire level at a point substantially in the range of 10–20 microamps. A properly selected trigistor, also a solid state device of the PNPN type, having suitably low current input to fire characteristics may be used in place of the silicon diffused junction PNPN controlled switch. Any solid state devices used as a switch 30 must have substantially zero leakage current and require very low input to fire current to the control electrode (gate or base as the case may be).

In the embodiment of FIGURE 2 wherein portions of the circuit not illustrated are the same as in the embodiment of FIGURE 1, similar components are, for the sake of convenience, numbered the same. Mechanical drive extension 42*b* of relay 32 is connected directly for opening relay switch 11 and breaking the R.F. signal input circuit when relay 32 is activated.

Referring to the embodiment of FIGURE 3, the solid state PNPN switch is replaced by a two-transistor solid state switch 49. Portions of the circuit not illustrated are the same as in the embodiment of FIGURE 1 and similar components are, for the sake of convenience, numbered the same. The two transistors are a PNP type transistor 50 and a NPN type transistor 51 which are connected together. They are connected, base 52 of the PNP transistor 50 to the collector 53 of NPN transistor 51, and collector 54 of PNP transistor 50 to base 55 of NPN transistor 51. Detector output lead 27 may be considered to be connected to the gate of the solid state switch 49 in being connected to the junction of collector 54 and the base 55 of transistors 50 and 51, respectively. Output lead 28 may be considered to be connected to the anode of switch 49 in being connected to the junction of the emitter 56 of NPN transistor 51 and the coil of relay 32. The normally closed contact 36 of switch 34, along with capacitor 40 and resistor 41 may be considered to be connected to the anode of solid state switch 49 in being connected to the emitter 57 of PNP transistor 50.

Transistors 50 and 51 may be silicon diffused junction PNP and NPN transistors, respectively, so chosen as to provide when connected as a solid state switch 49 substantially the same performance characteristics as provided by the silicon diffused junction PNPN controlled switch 30 in embodiment 1. In other words, switch 49 may be made to fire when the current input from detector 18 and switch 49 gate to cathode current flow rises to a relatively low firing maximum at a point substantially in the range of 10–20 microamps.

Whereas this invention is here illustrated and described with respect to several specific embodiments thereof, it should be realized that various changes may be made without departing from the essential contributions to the art made by the teachings hereof.

I claim:

1. A low power actuated switch controlled relay switching system comprising: a solid state switch having gate, anode, and cathode type connections; low power signal means, connected to the gate and cathode of said solid state switch, capable of providing a D.C. signal rising to a level low in the microamp range for firing said solid state switch; a relay with its coil connected between the cathode of said switch and ground; a double pole non-shorting relay switch having a normally closed contact, a normally open contact and a movable contact arm; a D.C.

supply connected between ground and said relay switch; the normally closed contact of said relay switch being connected to the anode connection of said solid state switch; the normally open contact of said relay switch being connected to the junction of the relay coil and the cathode of said solid state switch; a capacitor and a resistor connected in parallel to ground from the junction of the normally closed contact of the relay switch and the anode of said solid state switch; and additional switch means controlled by activation of said relay.

2. The switching system of claim 1, wherein said solid state switch is a PNPN type switch.

3. The switching system of claim 1, wherein said solid state switch includes a PNP transistor and a NPN transistor each having an emitter, collector, and a base, with the collector of each transistor connected to the base of the other, and having the emitter of the PNP transistor acting as the anode connection, the emitter of the NPN transistor acting as the cathode, and the junction between the collector of the PNP transistor and the base of the NPN transistor acting as the gate connection of the solid state switch.

4. The switching system of claim 1, wherein said low power signal means comprises a detector for sensing the R.F. signal level in a relatively low power level R.F. antenna to receiver input circuit and providing an output which varies directly with the power level of the R.F. signal in said antenna to receiver circuit and for applying said detector output signal as a D.C. input impressed from gate to cathode of said solid state switch.

5. The switching system of claim 4, wherein said solid state switch requires a maximum gate to cathode current to fire substantially within the range of 10–20 microamps, and wherein this current to fire the solid state switch is provided by said detector under a maximum power output not exceeding substantially 10 microwatts.

6. The switching system of claim 4, wherein said additional switch means is placed in said antenna to receiver circuit for breaking the circuit as controlled by activation of said relay for providing circuit overload shutoff.

7. The switching system of claim 6, wherein said additional switch means is an additional relay switch of said relay.

8. The switching system of claim 6, wherein said additional switch means includes an additional switch of said relay and an additional relay circuit connected to a power supply for control upon throwing of said additional switch by said relay, and said additional relay having a switch in said antenna to receiver circuit for breaking said circuit and providing overload shutoff when said relay is activated and said additional switch is thrown for controlling said additional relay.

9. The switching system of claim 1, wherein a current limiting resistor is provided in series with said D.C. supply between ground and said relay switch.

10. The switching system of claim 9, wherein said current limiting resistor is of a relatively low resistance with respect to the resistance of the resistor connected in parallel with said capacitor in substantially the ratio of 1 to 100 or less for charging of said capacitor substantially to the voltage of said D.C. supply.

11. The switching system of claim 9, wherein a manually operated switch circuit is provided across the coil of said relay for shorting out the coil and providing reset after each cycle of operation.

12. The switching system of claim 1, wherein said solid state switch requires a gate to cathode current to fire level falling substantially within the range of 10–20 microamps.

13. The switching system of claim 12, wherein said solid state switch has substantially zero anode to cathode leakage current in the unfired state.

14. In a low power actuated solid state switch controlled relay switching system including: a solid state switch having gate, anode, and cathode connections; low power drawing signal means, connected to the gate and cathode of said solid state switch, capable of providing a D.C. signal rising to the firing level of said solid state switch; relay means connected to the cathode of said switch, and having a double pole nonshorting relay switch with a normally closed contact, a normally open contact, and a movable contact arm; a D.C. supply connected to the movable contact arm of said relay switch; the normally closed contact of said relay switch being connected to the anode connection of said solid state switch; the normally open contact of said relay switch being connected to the junction of said relay means and the cathode of said solid state switch; energy storage means connected to the normally closed contact of said relay switch, and connected to the anode connection of said solid state switch for charging of said energy storage means by said D.C. supply while said movable contact arm is in the normally closed state, said energy storage means supplying relay activating power through said solid state switch after the movable contact arm has broken away from the normally closed contact of said relay switch and until the movable contact arm engages the normally open contact of the relay switch.

15. The switching system of claim 14, wherein said relay means has an actuating coil; and a manually operated switch circuit is provided across said actuating coil for shorting across the coil and providing reset after relay actuation in each cycle of operation.

16. A circuit overload responsive shutoff system for a relatively low power level antenna to radio frequency receiver input circuit including: solid state switching means having three electrode connections; R.F. signal detecting means connected to said antenna to R.F. receiver input circuit and having two output lines connected to two of the electrode connections of said solid state switching means for providing a D.C. signal varying as a function of the R.F. power level in said input circuit up to a level substantially in the order of 10–20 microamps and at a maximum power output not exceeding an output substantially in the order of 10 microwatts for firing said solid state switch; relay means connected to one of the electrodes of said solid state switch; said relay means having a double pole nonshorting relay switch with a normally closed contact, a normally open contact, and a movable contact arm; said relay also having an additional switch; a D.C. supply connected to the movable contact arm of said double pole relay switch; the normally closed contact of said double pole relay switch being connected to an electrode of said solid state switch; the normally open contact of said double pole relay switch being connected to the junction of said relay means and an electrode of said solid state switch; energy storage means connected to the junction of the normally closed contact of said double pole relay switch and an electrode of said solid state switch for charging of said energy storage means by said D.C. supply while said movable contact arm is in the normally closed state, and for said energy storage means to supply relay activating power through said solid state switch while the solid state switch is in the fired state, after the movable contact arm has broken away from the normally closed contact of the double pole relay switch, and until the movable contact arm engages the normally open contact of the relay switch; and means for breaking the antenna to R.F. receiver input circuit including the additional switch of said relay.

17. The circuit overload responsive shutoff system of claim 16, wherein said energy storage means is a capacitor; a resistor extending in parallel with said capacitor from the junction of the normally closed contact and an electrode of said solid state switch to a common voltage reference source; and said D.C. supply being connected in series with an additional resistor between said voltage reference source and the movable contact arm of the double pole relay switch.

18. The circuit overload responsive shutoff system of claim 17, wherein manually operated switch circuit means is provided across the coil of said relay means for shorting the coil and providing reset after each cycle of operation.

References Cited by the Examiner

UNITED STATES PATENTS

| | | | |
|---|---|---|---|
| 2,590,973 | 4/52 | Jordan | 317—142 X |
| 2,641,749 | 6/53 | Lawrence | 317—149 X |
| 3,060,381 | 10/62 | Turner et al. | 325—362 |

OTHER REFERENCES

"Applications and Circuit Design Notes"; published by Solid State Products, Incorporated; December 1959.

SAMUEL BERNSTEIN, *Primary Examiner.*